Jan. 29, 1952  P. E. COTTON  2,583,930
GAS ANALYZER AND SMOKE DETECTOR
Filed Dec. 4, 1948

Inventor
Paul E. Cotton
by Roberts, Cushman & Grover
Att'ys.

Patented Jan. 29, 1952

2,583,930

UNITED STATES PATENT OFFICE 2,583,930

GAS ANALYZER AND SMOKE DETECTOR

Paul E. Cotton, Quincy, Mass., assignor to Factory Mutual Research Corporation, Boston, Mass., a corporation of Massachusetts Application December 4, 1948, Serial No. 63,541

3 Claims. (Cl. 23—255)

This invention relates to apparatus for the continuous analysis of flammable gases (including vapors) and more particularly to apparatus having a heated catalytic resistance element which increases in temperature in proportion to increase in the proportion of the flammable component of the surrounding gas and an indicator responsive to the change in resistance resulting from the rise in temperature.

Heretofore apparatus of this type usually has comprised two resistance elements connected in a Wheatstone bridge. Both elements have consisted of heated platinum wires, one being exposed to the gas and the other being sealed in a glass tube or other chamber so as not to be affected by the gas. When combustion occurs on the exposed element the increase in resistance resulting from the rise in temperature unbalances the bridge and affords an indication on the galvanometer in the usual manner. This kind of apparatus has not been wholly satisfactory because of wide zero drift due to variations in the temperature of the gas, difference in thermal conductivity of the non-flammable components of the gas, the rate of flow of the gas past the exposed element, etc.

Objects of the present invention are to produce apparatus which is free from the aforesaid difficulty, which has substantially no zero drift, which accurately indicates the proportion of flammable material throughout a wide range of proportions, which is sensitive to minute proportions of flammable material, which is simple and economical in construction and which is durable and reliable in use.

According to the present invention the detector comprises two resistance elements and an indicator in an electrical circuit having terminals for connection to a source of current, the indicator being interconnected with the elements to indicate change in the ratio of the resistances of the elements, characterized in that both of the elements are exposed to the gas and one of said elements has higher catalytic activity than the other. The two elements should be connected in series, preferably in one side of a Wheatstone bridge with one side of the galvanometer circuit connected to a point between the two elements. In a more specific aspect both elements are catalytically active when heated and a catalyst is added to one of the elements to make it more active than the other. In the preferred embodiment the elements have the same physical and electrical characteristics, differing only in respect to the amount of catalyst associated therewith.

Figure 1:
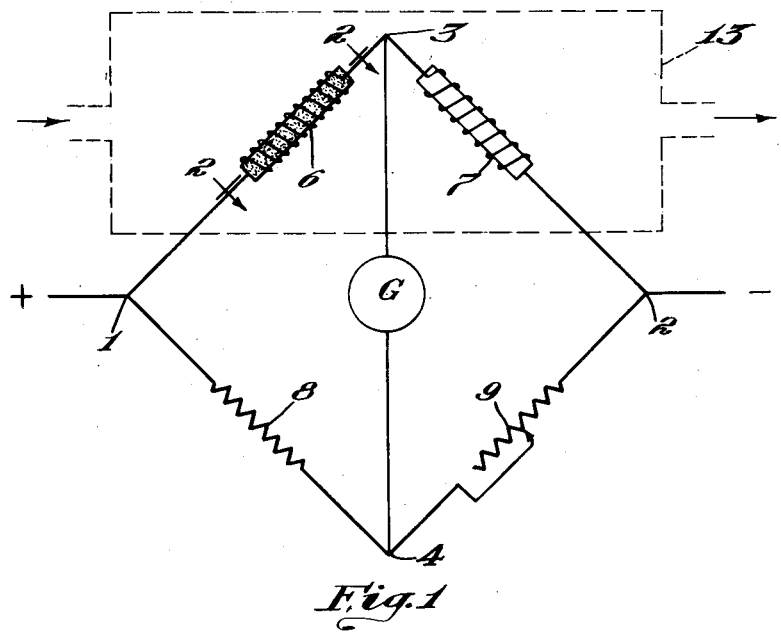
Figure 2:
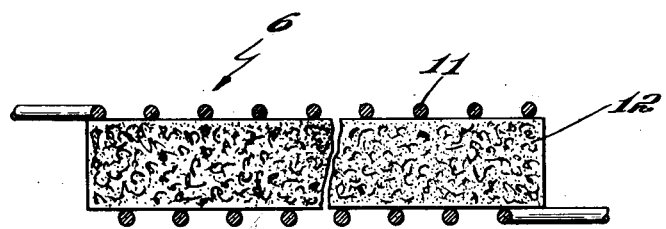

For the purpose of illustration a typical embodiment of the invention is shown in the accompanying drawings in which Fig. 1 is a diagrammatic representation of the preferred arrangement; and Fig. 2 is a section on line 2—2 of Fig. 1.

The particular embodiment chosen for the purpose of illustration comprises a Wheatstone bridge with terminals 1 and 2 for connection to a source of current, terminals 3 and 4 between which a galvanometer G is connected and resistances 6, 7, 8 and 9 in the four legs of the bridge. Resistances 8 and 9 may comprise the usual fixed or adjustable units. Each of the elements 6 and 7 comprises a platinum wire 11 wound on an asbestos core 12 with spaces between the turns of wire to expose the core. The elements 6 and 7 are identical in all respects except in that the core of 6 is impregnated with a catalyst as indicated by the stippling. While any suitable catalyst may be used, platinum or platinum-rhodium is preferable. As indicated by the broken lines 13 the two elements 6 and 7 may be located in a flow chamber having its inlet connected to a source of gas to be tested or analyzed. For fire detection purposes the two elements 6 and 7 may be located directly in the room or compartment to be protected so that the device will respond to the smoke as soon as a fire starts. Whether or not the two elements are enclosed in a flow chamber they should be close together so as to be subjected to like conditions of surrounding temperature, draft, etc.

The resistances 8 and 9 are set so that the galvanometer reads zero when elements 6 and 7 are exposed to gas having no flammable component. The current normally flowing through the elements 6 and 7 heats them to the point where the flammable component of the gas is oxidized as it contacts with the heated wire. However owing to the presence of the catalyst on the element 6 its temperature is raised more than that of element 7 by the oxidation of contacting gas. Consequently the bridge is unbalanced and the galvanometer G indicates the proportion of flammable material in the gas. Instead of the galvanometer the device may of course comprise a signal or relay for actuating any chosen protective apparatus.

From the foregoing it will be understood that the temperature change of the compensating element 7, in response to flammable gas, is taken into account in calibrating the indicator G. When there is no flammable gas in the air flowing through chamber 13 the active element 6 and the compensating element 7 are at the same temperature. As increasing amounts of flammable gas are added to the air the temperatures of both elements increase, compensating element 7 at a slow rate and the active element 6 at a rapid rate. Indicator G should indicate the difference between the two temperatures and this is easily accomplished in calibrating the instrument, particularly since the temperature curves of the two elements are approximately straight lines. The two elements 6 and 7 may be close together without affecting each other substantially, this being due to the fact that only a negligible proportion of the gas is burned and therefore the temperature of the gas is not increased appreciably.

It should be understood that the present disclosure is for the purpose of illustration only and that this invention includes all modifications and equivalents which fall within the scope of the appended claims.

I claim:

1. A gas detector comprising two resistance elements, each including a catalytically active wire having marked change in electrical resistance in response to change in temperature, the two wires being substantially identical in material, cross-sectional area and length, and the surfaces of the two wires being exposed substantially in the same way and to the same extent, each wire being wound on a core, an indicator, a Wheatstone bridge circuit having current terminals for connection to said indicator and means connecting said elements in series between the current terminals in one side of the bridge with one of said indicator terminals located between the two elements to cause the indicator to indicate change in the ratio of their resistances, the elements having substantially the same physical and electrical properties, both of said elements being exposed to the gas and one of said cores comprising additional catalytic material to make the element more active than the other element when the gas includes a flammable component.

2. A gas detector comprising two resistance elements, each including a catalytically active conductor having marked change in electrical resistance in response to change in temperature, the two conductors being substantially identical in material, cross-sectional area and length, and the surfaces of the two conductors being exposed to the gas substantially in the same way and to the same extent, an indicator, an electrical circuit connecting said conductors to a source of current to heat the conductors and to the indicator to indicate change in the ratio of their resistances, a support for catalytic material arranged in heat-transfer relationship to the conductor of one of said elements so that the material becomes active when the conductor is heated, and said one element having catalytic material on said support to make it more active than the other element when the conductors are heated.

3. A gas detector comprising two resistance elements, each including a catalytically active conductor having marked change in electrical resistance in response to change in temperature, each conductor being wound on a core, the two conductors being substantially identical in material, cross-sectional area and length, and the surfaces of the two conductors being exposed to the gas substantially in the same way and to the same extent, an indicator, an electrical circuit for connecting said conductors to a source of current to heat the conductors and to the indicator to indicate change in the ratio of their resistances, and catalytic material on the core of one of the elements to make it more active than the other element when the conductors are heated.

PAUL E. COTTON.

REFERENCES CITED

The following references are of record in the file of this patent:

UNITED STATES PATENTS

| Number | Name | Date |
| --- | --- | --- |
| 1,185,211 | Di Legge | May 30, 1916 |
| 1,940,513 | Stein | Dec. 19, 1933 |
| 1,942,323 | Blodgett | Jan. 2, 1934 |
| 2,219,391 | Jacobson | Oct. 29, 1940 |
| 2,244,366 | Jacobson et al. | June 3, 1941 |
| 2,279,397 | Hartline | Apr. 14, 1942 |
| 2,363,478 | Boeke | Nov. 28, 1944 |
| 2,369,811 | Stuart | Feb. 20, 1945 |

FOREIGN PATENTS

| Number | Country | Date |
| --- | --- | --- |
| 11,101 | Great Britain | May 30, 1891 |
| 369,137 | Great Britain | Mar. 17, 1932 |
| 418,399 | Germany | Sept. 4, 1925 |